United States Patent
Sun et al.

(10) Patent No.: US 12,266,152 B2
(45) Date of Patent: Apr. 1, 2025

(54) METHOD AND SYSTEM OF DESIGNING MEMRISTOR-BASED NAIVE BAYES CLASSIFIER AND CLASSIFIER

(71) Applicant: HUAZHONG UNIVERSITY OF SCIENCE AND TECHNOLOGY, Hubei (CN)

(72) Inventors: Huajun Sun, Hubei (CN); Zuopai Zhou, Hubei (CN); Li Li, Hubei (CN); Xiangshui Miao, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 458 days.

(21) Appl. No.: 17/775,591

(22) PCT Filed: May 7, 2021

(86) PCT No.: PCT/CN2021/092106
§ 371 (c)(1),
(2) Date: May 10, 2022

(87) PCT Pub. No.: WO2022/217673
PCT Pub. Date: Oct. 20, 2022

(65) Prior Publication Data
US 2023/0334824 A1    Oct. 19, 2023

(30) Foreign Application Priority Data
Apr. 14, 2021    (CN) .......................... 202110403525.X

(51) Int. Cl.
G06V 10/84    (2022.01)
G06N 3/06    (2006.01)
(Continued)

(52) U.S. Cl.
CPC .......... *G06V 10/764* (2022.01); *G06V 10/955* (2022.01)

(58) Field of Classification Search
CPC .................. G06V 10/764; G06V 10/84; G06F 18/24155; G06F 18/214; G06N 3/082
See application file for complete search history.

(56) References Cited

U.S. PATENT DOCUMENTS
2018/0276507 A1    9/2018    Marchezi et al.

FOREIGN PATENT DOCUMENTS
| | | |
|---|---|---|
| CN | 110956256 | 4/2020 |
| CN | 110993004 | 4/2020 |
| CN | 111027619 | 4/2020 |

OTHER PUBLICATIONS

Wu, B., Feng, D., Tong, W., Liu, J., Wang, C., Zhao, W., & Peng, M. (2019). RERAM crossbar-based analog computing architecture for Naive Bayesian engine | IEEE conference publication | IEEE xplore. https://ieeexplore.ieee.org/document/8988629/ (Year: 2019).*

(Continued)

*Primary Examiner* — Gregory A Morse
*Assistant Examiner* — David Alexander Wambst
(74) *Attorney, Agent, or Firm* — JCIPRNET

(57) ABSTRACT

A method and a system of designing a memristor-based naive Bayes classifier and a classifier belonging to the field of information technology are provided. The method includes: constructing a naive Bayes classifier including a memristor array of M rows by 2N columns, where M is the number of classification types, and N is the number of pixels in a picture; calculating the number $h_{j,2i-1}$ of the pixel value of 0 and the number $h_{j,2i}$ of the pixel value of 1 in an $i^{th}$ pixel in the $j^{th}$ training sample, where j=1, 2, ..., and M; and applying $h_{j,2i-1}$ pulses to a memristor $R_{j,2i-1}$ in a $j^{th}$ row and a $2i$-$1^{th}$ column to modulate the conductance of the memristor $R_{j,2i-1}$ and applying $h_{j,2i}$ pulses to a memristor $R_{j,2i}$ in (Continued)

the $j^{th}$ row and a $2i^{th}$ column to modulate the conductance of the memristor $R_{j,2i}$.

13 Claims, 3 Drawing Sheets

(51) Int. Cl.
*G06V 10/764* (2022.01)
*G06V 10/94* (2022.01)

(56) References Cited

OTHER PUBLICATIONS

Wikimedia Foundation. (May 5, 2020). Pruning (morphology). https://en.wikipedia.org/wiki/Pruning_(morphology) (Year: 2020).*

SciKit. (Aug. 4, 2016). 6.3. Preprocessing Data. scikit. https://scikit-learn.org/stable/modules/preprocessing.html (Year: 2016).*

Berdan, R., Marukame, T., Ota, K., Yamaguchi, M., Saitoh, M., Fujii, S., Deguchi, J., & Nishi, Y. (2020). Low-power linear computation using nonlinear ferroelectric tunnel junction memristors. (abstract only) Nature Electronics, 3(5), 259-266. https://doi.org/10.1038/s41928-020-0405-0 (Year: 2020).*

Kim, H., Mahmoodi, M. R., Nili, H., & Strukov, D. B. (2021). 4K-memristor analog-grade passive crossbar circuit. Nature Communications, 12(1). https://doi.org/10.1038/s41467-021-25455-0 (Year: 2021).*

Viswakumar, A., Ganganaik, P. B., Raj, P. M. P., Rao, B. P., & Kundu, S. (2021). Memristor-based in-memory processor for high precision semantic text classification. Computers & Electrical Engineering, 92, 107160. https://doi.org/10.1016/j.compeleceng.2021.107160 (Year: 2021).*

"International Search Report (Form PCT/ISA/210) of PCT/CN2021/092106," mailed on Jan. 17, 2022, pp. 1-5.

"Written Opinion of the International Searching Authority (Form PCT/ISA/237) of PCT/CN2021/092106," mailed on Jan. 17, 2022, pp. 1-4.

* cited by examiner

METHOD AND SYSTEM OF DESIGNING MEMRISTOR-BASED NAIVE BAYES CLASSIFIER AND CLASSIFIER

CROSS-REFERENCE TO RELATED APPLICATION

This application is a 371 of international application of PCT application serial no. PCT/CN2021/092106, filed on May 7, 2021, which claims the priority benefit of China application no. 202110403525.X, filed on Apr. 14, 2021. The entirety of each of the above mentioned patent applications is hereby incorporated by reference herein and made a part of this specification.

TECHNICAL FIELD

The disclosure belongs to the field of information technology, and more particularly, relates to a method and a system of designing a memristor-based naive Bayes classifier and a classifier.

DESCRIPTION OF RELATED ART

The development of artificial intelligence and the explosion of data have increased the requirements for computer performance. Since the fusion of storage and computing can be achieved through the in-memory computing architecture of new memories, breakthroughs in conventional computer architectures are expected, and the performance of existing computers can be greatly improved. As the most promising integrated memory-computing devices, memristors have become a hot spot for next-generation memories due to their non-volatility, fast read and write speed, easy integration, and low power consumption. The unique in-memory computing architecture of memristors can well simulate the mechanism of the integration of storage and computing in the human brain. Neural networks are the important learning algorithms in machine learning. When neural networks are implemented using memristors, device consistency and symmetry is highly required most of the time. Besides, the derivation calculation in the neural network learning algorithms is complex, and the calculation process is difficult to be implemented on memristors, so additional computing resources are required. In practical application, performance of neural network systems is also significantly affected by the non-ideal characteristics of memristors, such as device inconsistency, device errors, limited number of conductance states, nonlinearity and asymmetry of conductance distribution, and thus the application process is also restricted.

Naive Bayes classifiers are probabilistic classifiers based on Bayes' theorem. Compared with other neural network algorithms, the Naive Bayes classifiers feature simple structures, stable performance, and are more friendly to hardware. The naive Bayes classifiers mainly use the training data to learn the joint probability distribution and then obtain the posterior probability distribution. Learning the joint probability distribution requires logarithmic computation, which also restricts the implementation of the naive Bayesian classifiers on memristors. In a method for implementing a naive Bayes algorithm based on a memristor provided by the related art, through the crossbar array of the memristor and based on Ohm's law, the multiplication process in the naive Bayes algorithm is realized, and the final result is obtained by accumulation. However, it can only achieve recognition tasks with no more than three attributes, so the ubiquitousness is considerably limited.

SUMMARY

In view of the defects and improvement requirements of the related art, the disclosure provides a method and a system of designing a memristor-based naive Bayes classifier and a classifier, through which the asymmetric and nonlinear constraints of the conductance change of memristors in neural network applications are effectively overcome, accuracy degradation due to non-ideal resistive behavior is avoided, and the generality of the naive Bayes classifier is improved.

To achieve the abovementioned objective, according to an aspect of the disclosure, a method of designing a memristor-based naive Bayes classifier is provided, and the method includes the following steps. In S1, a naive Bayes classifier including a memristor array of M rows by 2N columns is constructed, where M is the number of types outputted by the naive Bayes classifier, N is the number of pixels in a picture, and the pixel value of each pixel is 0 or 1. In S2, a $j^{th}$ training sample corresponding to a $j^{th}$ type is selected from training samples, and the number $h_{j,2i-1}$ of the pixel value of 0 and the number $h_{j,2i}$ of the pixel value of 1 in an 0 pixel in the $j^{th}$ training sample are calculated, where j=1, 2, ..., and M, and i=1, 2, ..., and N. In S3, $h_{j,2i-1}$ pulses are applied to a memristor $R_{j,2i-1}$ in $j^{th}$ row and a $2i-1^{th}$ column to modulate the conductance of the memristor $R_{j,2i-1}$, ..., and $h_{j,2i}$ pulses are applied to a memristor $R_{j,2i}$ in the $j^{th}$ row and a $2i^{th}$ column to modulate the conductance of the memristor $R_{j,2i}$. The modulated naive Bayes classifier is used to identify the type of the picture to be classified.

Further, during modulation, the conductance of each memristor is:

$$G = a \times \ln(N_1) + b$$

A classification statistical calculation probability corresponding to the memristor and the conductance of the memristor satisfy:

$$\ln P \propto -G,$$

where G is the conductance of the memristor, $N_1$ is the number of pulses applied to the memristor, P is the conditional probability value corresponding to the memristor, in P is the classification statistical calculation probability, a is a first fitting parameter, and b is a second fitting parameter.

Further, S3 further includes the following step. The pixel value of each pixel in the picture to be classified is obtained, and a pulse is applied to the memristor in the $2i-1^{th}$ column when the pixel value of the $i^{th}$ pixel is 0, otherwise, a pulse is applied to the memristor in the $2i^{th}$ column. Currents at output terminals of the memristors in each row in the naive Bayes classifier are compared. The type of the row corresponding to a minimum current is the type of the picture to be classified.

Further, S1 further includes the following step. The number M of sample types in the training samples is obtained, and pixel division is performed on the training samples to divide each training sample into N pixels. The number of rows of the memristor array is designed to be M, and the number of columns of the memristor array is designed to be 2N.

Further, when the number of the training samples exceeds the range of the number of samples corresponding to the conductance range of the memristors, S2 further includes the following steps. Equal scaling is performed on $h_{j,2i-1}$ and $h_{j,2i}$ to reduce each $h_{j,2i-1}$ and $h_{j,2i}$ to the range of the number of samples corresponding to the conductance range of the memristors. The conductance of the memristor $R_{j,2i-1}$ and the conductance of the memristor $R_{j,2i}$ are modulated according to the reduced $h_{j,2i-1}$ and $h_{j,2i}$ in S3.

Further, when anew training sample is added to the training samples, S3 further includes the following step. According to a type j' of the added training sample and the pixel value of each pixel i in the added training sample, a pulse is applied to the memristor in a $j^{th}$ row and the $2i-1^{th}$ column or in the $j^{th}$ row and the $2i^{th}$ column in the modulated Naive Bayes classifier for conductance modulation.

Further, when redundancy is present in the number of columns of the memristor array, S3 further includes the following step. The memristor column corresponding to each pixel in the naive Bayes classifier is optimized after modulation through pruning.

Further, before the modulation in S3 is performed, the method further includes the following step. The conductance of each memristor in the memristor array is initialized to a maximum conductance value of the memristor.

According to another aspect of the disclosure, a system of designing a memristor-based naive Bayes classifier is provided, and the system includes a construction module, a selection and calculation module, and a modulation module. The construction module is configured to construct a naive Bayes classifier including a memristor array of M rows by 2N columns, where M is the number of types outputted by the naive Bayes classifier, N is the number of pixels in a picture, and the pixel value of each pixel is 0 or 1. The selection and calculation module is configured to select a $j^{th}$ training sample corresponding to a $j^{th}$ type from training samples and calculate the number $h_{j,2i-1}$ of the pixel value of 0 and the number $h_{j,2i}$ of the pixel value of 1 in an $i^{th}$ pixel in the $j^{th}$ training sample, where j=1, 2, . . . , and M, and i=1, 2, . . . , and N. The modulation module is configured to apply $h_{j,2i-1}$ pulses to a memristor $R_{j,2i-1}$ in a $j^{th}$ row and a $2i-1^{th}$ column to modulate the conductance of the memristor $R_{j,2i-1}$ and apply $h_{j,2i}$ pulses to a memristor $R_{j,2i}$ in the $j^{th}$ row and a $2i^{th}$ column to modulate the conductance of the memristor $R_{j,2i}$. The modulated naive Bayes classifier is used to identify the type of a picture to be classified.

According to another aspect of the disclosure, a memristor-based naive Bayes classifier is provided. The memristor-based naive Bayes classifier is obtained through the method of designing the memristor-based naive Bayes classifier.

In general, the above technical solutions provided by the disclosure have the following beneficial effects:

(1) By combining the nonlinearity and asymmetry of the memristor conductance with a naive Bayes algorithm, an inverse relationship between the classification statistical calculation probability and memristor conductance is found. Based on this finding, the probability value calculation process in the naive Bayes algorithm is mapped into the characteristic of the memristor conductance that changes as a logarithmic function with the number of pulses. By adjusting the number of input pulses in the memristor, the output probability value of the corresponding category is calculated to achieve the classification, so that the training and inference of the naive Bayes classifier may be implemented on the memristor. The nonlinear conductance of the memristors is effectively utilized, and the cumbersome calculation process and the consumption of additional computing resources are avoided, and the generality of the naive Bayes classifier is improved. The naive Bayes classifier implements true learning entirely on memristor array without requiring additional computational resources.

(2) When the number of training samples exceeds the range of the number of samples corresponding to the conductance range of the memristors, the attribute information of each attribute is scaled. In this way, one pulse corresponds to the information of multiple samples, so that the classifier may be trained according to all the training samples, and the classification accuracy of the classifier after training is guaranteed.

(3) Through pruning, the attributes of the training samples are filtered to optimize the naive Bayes classifier. The naive Bayes classifier is further improved into a memristor-based selective Bayes classifier, which can better tolerate the non-ideal characteristics of the memristors.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

In the disclosure, the terms "first", "second", and the like (if any) in the disclosure and the accompanying drawings are used to distinguish similar objects, and are not necessarily used to describe a specific order or sequence.

Figure 1:
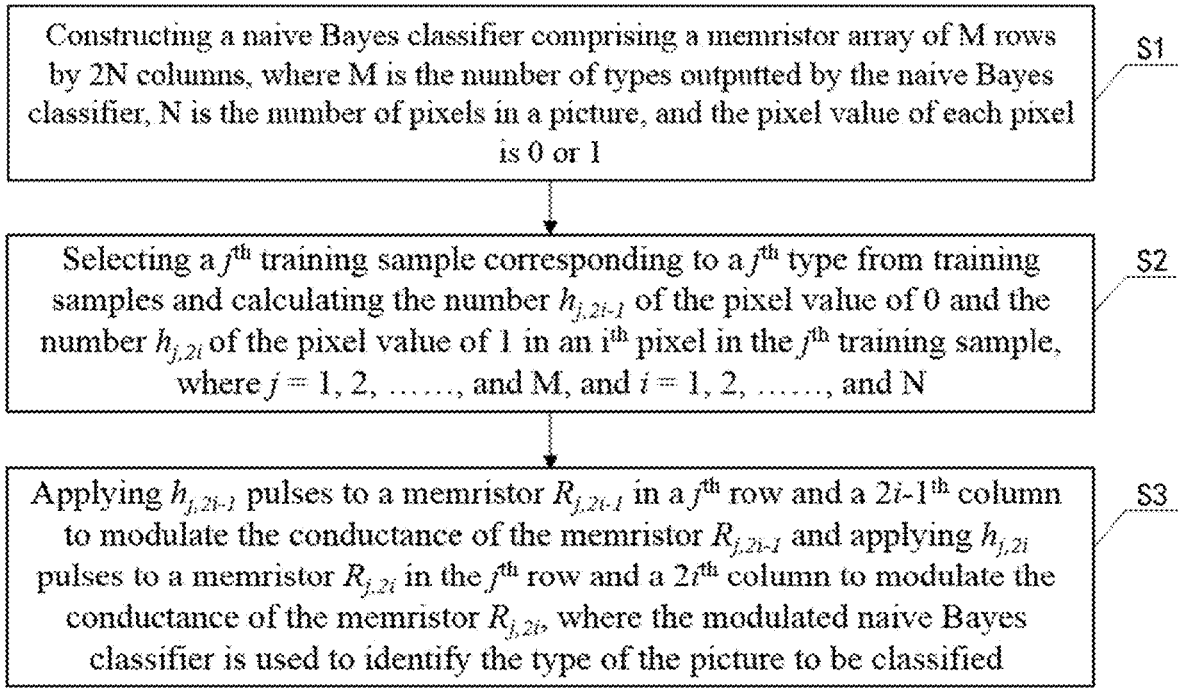
FIG. 1 is a flow chart of a method of designing a memristor-based naive Bayes classifier provided by an embodiment of the disclosure.

FIG. 1 is a flow chart of a method of designing a memristor-based naive Bayes classifier provided by an embodiment of the disclosure. With reference to FIG. 1 together with FIG. 2 to FIG. 3, a method of designing a memristor-based naive Bayes classifier provided by this embodiment is described in detail as follows. With reference to FIG. 1, this method includes operation S1 to operation S3.

In operation S1, a naive Bayes classifier comprising a memristor array of M rows by 2N columns is constructed, where M is the number of types outputted by the naive Bayes classifier, N is the number of pixels in a picture, and the pixel value of each pixel is 0 or 1.

Figure 2:
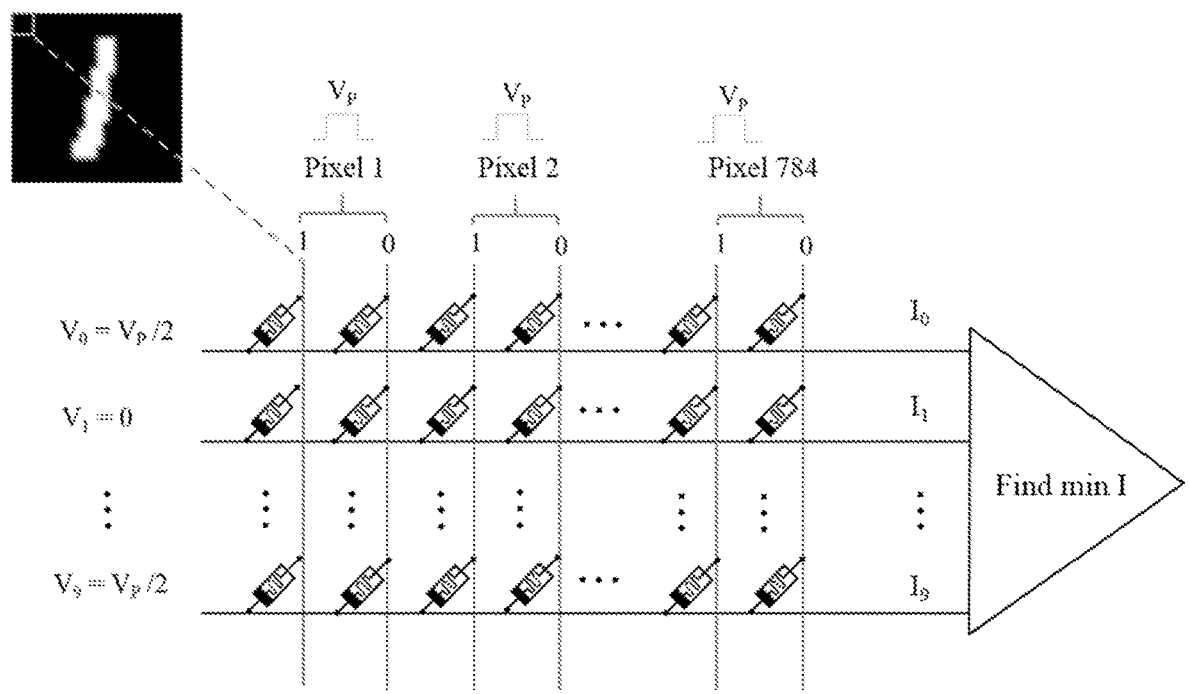
FIG. 2 is a schematic diagram of a circuit structure of the memristor-based naive Bayes classifier provided by an embodiment of the disclosure.

In the embodiments of the disclosure, the number M of sample types in training samples is obtained, and pixel division is performed on sample pictures in the training samples to divide each training sample into N pixels. The sample pictures in the training samples are binarized into black and white images. Therefore, each pixel has two attribute values of 0 and 1, and two columns of memristors are correspondingly designed for each pixel. The number of rows of the memristor array is designed to be M rows, and the number of columns of the memristor array is designed to be 2N, forming a memristor array of M×2N, as shown in FIG. 2.

Taking the naive Bayes classifier used to identify the numbers 0 to 9 in the sample picture as an example, the sample types in the training samples include ten types of 0, 1, 2, 3, 4, 5, 6, 7, 8 and 9. That is, the number M of sample types is 10, and thus 10 rows of memristors are required to be designed. Each row of memristors corresponds to one sample type. For instance, each row of the circuit structure from top to bottom in FIG. 2 corresponds to sample types 0, 1, 2, 3, 4, 5, 6, 7, 8, and 9 in sequence.

Further, for example, a MNIST dataset is selected as a training sample. A MNIST data picture is binarized into a black and white image, each picture contains 28×28 pixels, each pixel represents an attribute, and there are 784 attributes in total. Each pixel has two pixel values (i.e., attribute values) of 0 and 1. A pixel value of 0 indicates that the pixel is white, and a pixel value of 1 indicates that the pixel is black. Two memristors are used to represent one attribute, representing the two cases where the pixel value is 0 and 1, so 1568 memristors are required to be designed in each row.

Based on this, the constructed naive Bayes classifier includes a memristor array with 10 rows and 1,568 columns, where every two columns represent an attribute, and each row represents a category. It can be understood that in this embodiment, the rows and columns of the memristor array are interchangeable. After the interchange, the columns correspond to the classification types, and the rows correspond to the corresponding attribute values.

In operation S2, a $j^{th}$ training sample corresponding to a P type is selected from the training samples, and the number $h_{j,2i-1}$ of the pixel value of 0 and the number $h_{j,2i}$ of the pixel value of 1 in an $i^{th}$ pixel in the $j^{th}$ training sample are calculated, where j=1, 2, . . . , and M, and i=1, 2, . . . , and N.

Taking the naive Bayes classifier shown in FIG. 2 for identifying numbers 0 to 9 in a picture as an example again, the sample pictures are divided into 10 types based on the numbers in the sample pictures of the training samples. Taking first pixels of sample pictures of a first type as an example, assuming that the number of sample pictures in the first type is s, the number of sample pictures whose first pixel is black is s1, the number of sample pictures whose first pixel is white is $s_2$, and $s_1+s_2=s$, then the number of occurrences $h_{1,1}$ of the pixel value 0 in the first pixels in a first training sample is $s_2$, and the number of occurrences $h_{1,2}$ of the pixel value 1 in the first pixels in the first training sample is s1. By analogy, the number of occurrences of the pixel value 0 and the number of occurrences of the pixel value 1 in the pixels in the training samples corresponding to each type are calculated.

Further, in the embodiments of the disclosure, by analyzing a naive Bayes algorithm, it can be known that in the case where the numbers of all categories of the samples are the same, the naive Bayes classifier only needs to find a logarithmic form ln P of a conditional probability P of each attribute in that category. The conditional probability P is proportional to the number of occurrences n of an inputted feature. During a reset process of each memristor, its conductance value G is inversely proportional to the logarithm of the number of pulses $N_1$ applied to the memristor, which satisfies the following relation:

$$G=a\times\ln(N_1)+b$$

It should be noted that, in practical applications, the relationship between the conductance value G and the number of pulses $N_1$ conforms to the trend defined by the abovementioned relation, that is, it can be fitted to the abovementioned relation to a certain extent, but the two are not completely consistent. A pulse electrical characteristic curve of the memristor selected in this embodiment should conform to the above relation as much as possible. Further, the number n of inputted data attribute values is linearly mapped to the number of pulses $N_1$ applied to the memristor, which satisfies the following relation:

$$N_1=a\times n$$

Therefore, a classification statistics calculation probability corresponding to the memristor is inversely proportional to the conductance of the memristor, which satisfies the following relation:

$$\ln P \propto \ln n \propto \ln N_1 \propto -G,$$

where G is the conductance of the memristor, $N_1$ is the number of pulses applied to the memristor, P is a conditional probability value corresponding to the memristor, in P is a classification statistical calculation probability, a is a first fitting parameter, and b is a second fitting parameter.

Based on this, the mapping of the probability value to the memristor conductance value is implemented in the embodiments of the disclosure. The naive Bayes classifier mainly classifies the input data into the class with the largest posterior probability and does not require detailed probability values, so the naive Bayes classifier may be completely implemented on the memristors through the above mapping process.

In operation S3, $h_{j,2i-1}$ pulses are applied to a memristor $R_{j,2i-1}$ in a $j^{th}$ row and a $2i-1^{th}$ column to modulate conductance of the memristor $R_{j,2i-1}$, and $h_{j,2i}$ pulses are applied to a memristor $R_{j,2i}$ in the $j^{th}$ row and a $2i^{th}$ column to modulate conductance of the memristor $R_{j,2i}$. The modulated naive Bayes classifier is used to identify the type of the picture to be classified.

Figure 3:
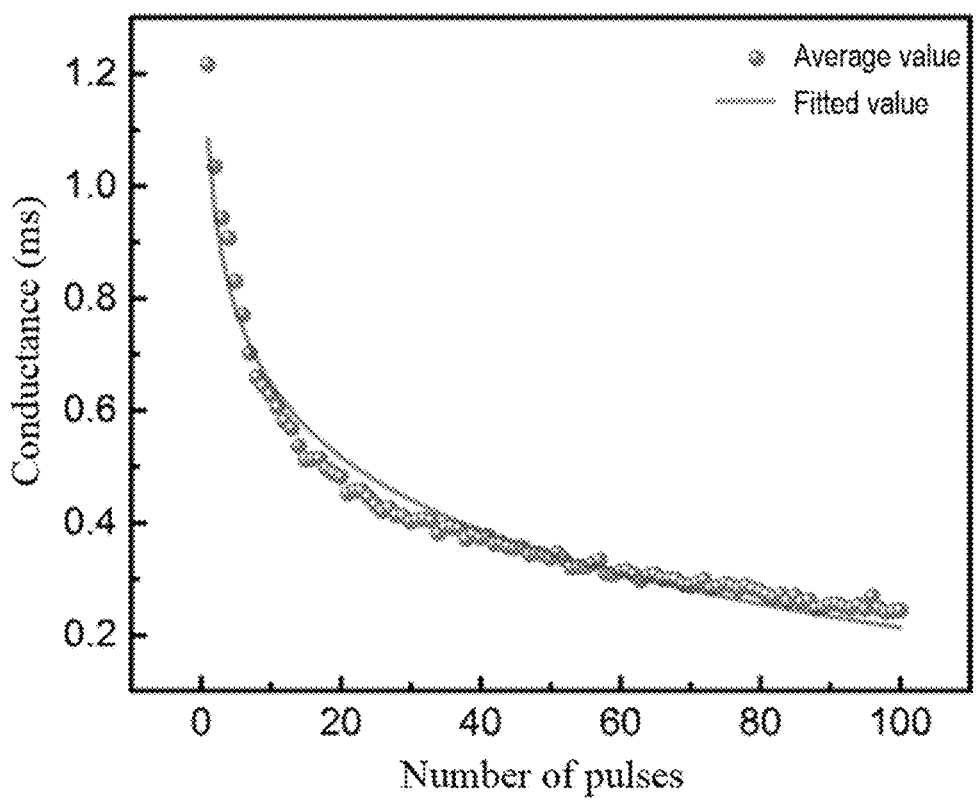
FIG. 3 is a schematic graph of a fitting curve of the change of conductance with the number of externally applied pulses during a reset process of a memristor provided by an embodiment of the disclosure.

A fitting curve of a change of conductance with the number of externally applied pulses during the reset process of the memristor is shown in FIG. 3. In this embodiment, a position to which the pulses should be applied may be determined according to the categories and attribute values of the training samples, and the conductance values may be adjusted by applying pulses on the corresponding rows and columns to achieve the training of the Naive Bayes classifier.

Before training, the conductance of each memristor in the memristor array is initialized to a maximum conductance value of the memristor, and then each memristor is trained after initialization. In the crossbar array, two columns represent an attribute, and each row represents a category. In this embodiment, at least the following two memristor conductance modulation solutions are provided in operation S2 and operation S3:

In the first modulation solution, each sample picture is trained one by one. When each sample picture is trained, the row corresponding to the sample picture category is selected, a pulse is applied to the memristor in the column corresponding to the attribute value of each attribute of the sample picture and conductance modulation is performed to train the sample picture.

In the second modulation solution, each sample picture is trained in parallel. The number of occurrences of each attribute value in each attribute in various sample pictures is counted, and the corresponding number of pulses that should be applied to each memristor is obtained. The corresponding memristors are selected and corresponding number of pulses are applied for conductance modulation to complete the training of all sample pictures.

To be specific, the circuit structure shown in FIG. 2 is treated as an example herein again. During the training process, the first pixel of the number 1 is black, and the column with the feature value of 1 in the first pixel is selected, and a pulse voltage with an amplitude of VP is applied. Further, in order to prevent all rows representing other numbers in this column from being selected and thus affected, $V_P/2$ conductance is applied to all rows that are not number 1. In this way, in the selected first column, except for the second row whose pulse voltage is $V_P$, all other unselected rows have the voltage of $V_P/2$. By controlling $V_P/2$ to be less than a threshold voltage $V_d$ of the device, while $V_P$ is greater than the threshold voltage $V_d$, all rows are prevented from being selected at the same time during the training process, and the setting of each memristor conductance value may be precisely controlled. Further, corresponding pulse voltages may be applied to all columns at the same time, row-by-row operation is thereby achieved during training. In this way, one picture or a class of pictures may be trained in one operation during the training process, and time complexity of the training process may thus be considerably lowered.

Taking the circuit structure shown in FIG. 2 as an example, for any pixel, its corresponding first column of memristors corresponds to pixel value 1, and its corresponding second column of memristors corresponds to pixel value 0. At this time, in operation S3, $h_{j,2i-1}$ pulses are applied to the memristor $R_{j,2i}$ in the $j^{th}$ row and the $2i^{th}$ column to modulate the conductance of the memristor $R_{j,2i}$, and $h_{j,2i}$ pulses are applied to the memristor $R_{j,2i-1}$ in the $j^{th}$ row and the $2i-1^{th}$ column to modulate the conductance of the memristor $R_{j,2i-1}$. It can be understood that, the corresponding first column of memristors may also correspond to the pixel value 0, and the corresponding second column of memristors may also correspond to the pixel value 1. At this time, in operation S3, $h_{j,2i-1}$ pulses are applied to the memristor $R_{j,2i-1}$ in the $j^{th}$ row and the $2i-1^{th}$ column to modulate the conductance of the memristor $R_{j,2i-1}$, and $h_{j,2i}$ pulses are applied to the memristor $R_{j,2i}$ in the $j^{th}$ row and the $2i^{th}$ column to modulate the conductance of the memristor $R_{j,2i}$.

In the embodiments of the disclosure, when the number of the training samples exceeds the range of the number of samples corresponding to the conductance range of the memristors, the conductance of all memristors may be set to the initial state. Operation S2 further includes the following operation. Equal scaling is performed on $h_{j,2i-1}$ and $h_{j,2i}$ to reduce each $h_{j,2i-1}$ and $h_{j,2i}$ to the range of the number of samples corresponding to the conductance range of the memristors. Herein, the conductance of the memristor $R_{j,2i-1}$ and the conductance of the memristor $R_{j,2i}$ are modulated according to the reduced $h_{j,2i-1}$ and $h_{j,2i}$ in operation S3, where j=1, 2, . . . , and M, and i=1, 2, . . . , and N. To be specific, $h_{j,2i-1}'$ pulses are applied to the memristor $R_{j,2i-1}$ in the $j^{th}$ row and the $2i-1^{th}$ column to modulate the conductance of the memristor $R_{j,2i-1}$, and $h_{j,2i}'$ pulses are applied to the memristor $R_{j,2i}$ in the $j^{th}$ row and the $2i^{th}$ column to modulate the conductance of the memristor $R_{j,2i}$. $h_{j,2i-1}'$ and $h_{j,2i}'$ are the scaled results of $h_{j,2i-1}$ and $h_{j,2i}$, respectively.

In the embodiments of the disclosure, when a new training sample is added to the training samples, the added sample may be directly trained on the basis of the original array, and it is only necessary to control the number of samples of each category to be the same. Herein, operation S3 further includes the following operation. A pulse is applied to the memristor in a $j^{th}$ row and the $2i-1^{th}$ column or in the $j^{th}$ row and the $2i^{th}$ column in the modulated Naive Bayes classifier for conductance modulation according to a type $j^{th}$ of the added training sample and the pixel value of each pixel i in the added training sample, where j'=1, 2, . . . , and M. The training process of the added training sample is the same as the training process of the original training samples, and description thereof is not repeated herein.

In the embodiments of the disclosure, when redundancy is present in the number of columns of the memristor array, operation S3 further includes the following operation. The memristor column corresponding to each pixel in the naive Bayes classifier is optimized after modulation through pruning. Because the characteristics of the memristors are unstable, the conductance values of the memristors may not reach a predetermined conductance value, and an error is thereby generated. Therefore, when the number of training sample attributes is sufficient, the attributes may be filtered through a validation set. To be specific, after training is completed, the accuracy of the Naive Bayes classifier is tested through the validation set by removing the corresponding attribute. If the accuracy drops, the attribute is deleted; otherwise, the next attribute continues to be filtered until the accuracy of the Naive Bayes classifier is not reduced by deleting any attribute. Finally, the attribute set is the optimal subset after pruning.

Correspondingly, attributes may also be continuously added to an empty set to determine whether the accuracy of the Naive Bayes classifier will drop. If the accuracy drops, the attribute is not be added, otherwise the next attribute continues to be traversed after the attribute is added until the accuracy of the Naive Bayes classifier will drop if any attribute is added and such operation is then stopped.

In this embodiment, when the trained naive Bayes classifier needs to be re-trained on other training sets, all the memristors may be reset to the initial state, then the naive Bayes classifier may be trained by using the training samples in other training sets to implement other classification functions.

In the embodiments of the disclosure, operation S3 further includes the following operations. The pixel value of each pixel in the picture to be classified is obtained, and a pulse is applied to the memristor in the $2i-1^{th}$ column when the pixel value of the $i^{th}$ pixel is 0, otherwise, a pulse is applied to the memristor in the $2i^{th}$ column. Currents at output terminals of the memristors in each row in the naive Bayes classifier are compared. The type of the row corresponding to a minimum current is the type of the picture to be classified. In the prediction process, only the picture to be classified needs to be inputted into each column, and then all the rows are selected at the same time, that is, the voltage 0 is applied to each row, so that the probability value of each category may be calculated in parallel. At this time, the row with the smallest output current represents the classification result of the Naive Bayes classifier.

Figure 4:
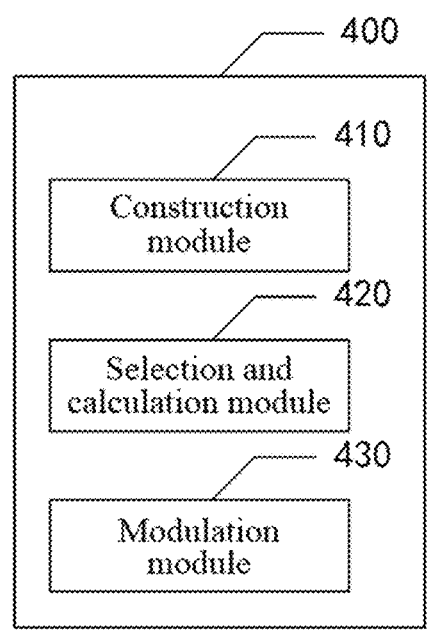
FIG. 4 is a block diagram of a system of designing a memristor-based naive Bayes classifier provided by an embodiment of the disclosure.

FIG. 4 is a block diagram of a system of designing a memristor-based naive Bayes classifier provided by an embodiment of the disclosure. With reference to FIG. 4, a system of designing a memristor-based naive Bayes classifier 400 includes a construction module 410, a selection and calculation module 420, and a modulation module 430.

The construction module 410 executes operation S1, for example, and is configured to construct a naive Bayes classifier including a memristor array of M rows by 2N columns, where M is the number of types outputted by the naive Bayes classifier, N is the number of pixels in a picture, and the pixel value of each pixel is 0 or 1.

The selection and calculation module 420 executes operation S2, for example, and is configured to select a $j^{th}$ training sample corresponding to a $j^{th}$ type from the training samples, and calculates the number $h_{j,2i-1}$ of the pixel value of 0 and the number $h_{j,2i}$ of the pixel value of 1 in an $j^{th}$ pixel in the $j^{th}$ training sample, where j=1, 2, ..., and M, and i=1, 2, ..., and N.

The modulation module 430 executes operation S3, for example, and is configured to apply $h_{j,2i-1}$ pulses to a memristor $R_{j,2i-1}$ in a $j^{th}$ row and a $2i-1^{th}$ column to modulate the conductance of the memristor $R_{j,2i-1}$ and apply $h_{j,2i}$ pulses to a memristor $R_{j,2i}$ in the $j^{th}$ row and a $2i^{th}$ column to modulate the conductance of the memristor $R_{j,2i}$. The modulated naive Bayes classifier is used to identify the type of a picture to be classified.

The system of designing a memristor-based naive Bayes classifier 400 is configured to execute the method of designing the memristor-based naive Bayes classifier shown in the embodiments of FIG. 1 to FIG. 3. Description of the details that are not provided in this embodiment may be found with reference to the method of designing the memristor-based naive Bayes classifier shown in the embodiments of FIG. 1 to FIG. 3, and such description therefore is not repeated herein.

The embodiments of the disclosure further provide a memristor-based naive Bayes classifier, which is obtained by the method of designing the memristor-based naive Bayes classifier shown in the embodiments of FIG. 1 to FIG. 3, and the structure of such classifier is shown in FIG. 2. Description of the details that are not provided in this embodiment may be found with reference to the method of designing the memristor-based naive Bayes classifier shown in the embodiments of FIG. 1 to FIG. 3, and such description therefore is not repeated herein.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A method of designing a memristor-based naive Bayes classifier, comprising:
   S1: constructing a naive Bayes classifier comprising a memristor array of M rows by 2N columns, where M is the number of types outputted by the naive Bayes classifier, N is the number of pixels in a picture, and the pixel value of each pixel is 0 or 1;
   S2: selecting a $j^{th}$ training sample corresponding to a $j^{th}$ type from training samples and calculating the number $h_{j,2i-1}$ of the pixel value of 0 and the number $h_{j,2i}$ of the pixel value of 1 in an $i^{th}$ pixel in the $j^{th}$ training sample, where j=1, 2, ..., and M, and i=1, 2, ..., and N; and
   S3: applying $h_{j,2i-1}$ pulses to a memristor $R_{j,2i-1}$ in a $j^{th}$ row and a $2i-1^{th}$ column to modulate the conductance of the memristor $R_{j,2i-1}$ and applying $h_{j,2i}$ pulses to a memristor $R_{j,2i}$ in the $j^{th}$ row and a $2i^{th}$ column to modulate the conductance of the memristor $R_{j,2i}$,
   wherein the memristor-based naive Bayes classifier is obtained through S1 to S3,
   wherein during modulation, the conductance of each memristor is:

$G = a \times \ln(N_1) + b$, and a classification statistical calculation probability corresponding to the memristor and the conductance of the memristor satisfy:

$\ln P \propto -G$ wherein G is the conductance of the memristor, $N_1$ is the number of pulses applied to the memristor, P is a conditional probability value corresponding to the memristor, ln P is the classification statistical calculation probability, a is a first fitting parameter, and b is a second fitting parameter.

2. The method of designing the memristor-based naive Bayes classifier according to claim 1, wherein the S3 further comprises:
   obtaining the pixel value of each pixel in the picture to be classified, applying a pulse to the memristor in the $2i-1^{th}$ column when the pixel value of the $i^{th}$ pixel is 0, otherwise, applying a pulse to the memristor in the $2i^{th}$ column; and
   comparing currents at output terminals of the memristors in each row in the naive Bayes classifier, wherein the type of the row corresponding to a minimum current is the type of the picture to be classified.

3. The method of designing the memristor-based naive Bayes classifier according to claim 1, wherein the S1 further comprises:
   obtaining the number M of sample types in the training samples and performing pixel division on the training samples to divide each training sample into N pixels; and
   designing the number of rows of the memristor array to be M and designing the number of columns of the memristor array to be 2N.

4. The method of designing the memristor-based naive Bayes classifier according to claim 1, wherein when the number of the training samples exceeds the range of the number of samples corresponding to the conductance range of the memristors, the S2 further includes: performing equal scaling on $h_{j,2i-1}$ and $h_{j,2i}$ to reduce each $h_{j,2i-1}$ and $h_{j,2i}$ to the range of the number of samples corresponding to the conductance range of the memristors; and
   modulating the conductance of the memristor $R_{j,2i-1}$ and the conductance of the memristor $R_{j,2i}$ according to the reduced $h_{j,2i-1}$ and $h_{j,2i}$ in the S3.

5. The method of designing the memristor-based naive Bayes classifier according to claim 1, wherein when a new training sample is added to the training samples, the S3 further comprises:
   applying a pulse to the memristor in a $j^{th}$ row and the $2i-1^{th}$ column or in the $j^{th}$ row and the $2i^{th}$ column in the modulated Naive Bayes classifier for conductance modulation according to a type j' of the added training sample and the pixel value of each pixel i in the added training sample.

6. The method of designing the memristor-based naive Bayes classifier according to claim 1, wherein when redundancy is present in the number of columns of the memristor array, the S3 further comprises:
   optimizing the memristor column corresponding to each pixel in the naive Bayes classifier after modulation through pruning.

7. The method of designing the memristor-based naive Bayes classifier according to claim 1, wherein before the modulation in the S3 is performed, the method further comprises: initializing the conductance of each memristor in the memristor array to a maximum conductance value of the memristor.

8. A system of designing a memristor-based naive Bayes classifier, comprising:
- a construction module, configured to construct a naive Bayes classifier comprising a memristor array of M rows by 2N columns, where M is the number of types outputted by the naive Bayes classifier, N is the number of pixels in a picture, and the pixel value of each pixel is 0 or 1;
- a selection and calculation module, configured to select a $j^{th}$ training sample corresponding to a $j^{th}$ type from training samples and calculate the number $h_{j,2i-1}$ of the pixel value of 0 and the number $h_{j,2i}$ of the pixel value of 1 in an $i^{th}$ pixel in the $j^{th}$ training sample, where $j=1, 2, \ldots,$ and M, and $i=1, 2, \ldots,$ and N; and
- a modulation module, configured to apply $h_{j,2i-1}$ pulses to a memristor $R_{j,2i-1}$ in a $j^{th}$ row and a $2i-1^{th}$ column to modulate the conductance of the memristor $R_{j,2i-1}$ and apply $h_{j,2i}$ pulses to a memristor $R_{j,2i}$ in the $j^{th}$ row and a $2i^{th}$ column to modulate the conductance of the memristor $R_{j,2i}$,
- wherein the memristor-based naive Bayes classifier is obtained through S1 to S3,
- wherein during modulation, the conductance of each memristor is:

$$G = a \times \ln(N_1) + b, \text{ and}$$

a classification statistical calculation probability corresponding to the memristor and the conductance of the memristor satisfy:

$$\ln P \propto -G$$

wherein G is the conductance of the memristor, $N_1$ is the number of pulses applied to the memristor, P is a conditional probability value corresponding to the memristor, ln P is the classification statistical calculation probability, a is a first fitting parameter, and b is a second fitting parameter.

9. The method of designing the memristor-based naive Bayes classifier according to claim 2, wherein before the modulation in the S3 is performed, the method further comprises: initializing the conductance of each memristor in the memristor array to a maximum conductance value of the memristor.

10. The method of designing the memristor-based naive Bayes classifier according to claim 3, wherein before the modulation in the S3 is performed, the method further comprises: initializing the conductance of each memristor in the memristor array to a maximum conductance value of the memristor.

11. The method of designing the memristor-based naive Bayes classifier according to claim 4, wherein before the modulation in the S3 is performed, the method further comprises: initializing the conductance of each memristor in the memristor array to a maximum conductance value of the memristor.

12. The method of designing the memristor-based naive Bayes classifier according to claim 5, wherein before the modulation in the S3 is performed, the method further comprises: initializing the conductance of each memristor in the memristor array to a maximum conductance value of the memristor.

13. The method of designing the memristor-based naive Bayes classifier according to claim 6, wherein before the modulation in the S3 is performed, the method further comprises: initializing the conductance of each memristor in the memristor array to a maximum conductance value of the memristor.

* * * * *